US012688786B2

(12) United States Patent
Mohsen et al.

(10) Patent No.: US 12,688,786 B2
(45) Date of Patent: Jul. 21, 2026

(54) METHODS AND SYSTEMS FOR SECURE SCALABLE PLATFORM PROVIDING EDUCATION PROGRAMS

(71) Applicant: Hope Artificial Intelligence Inc., Los Gatos, CA (US)

(72) Inventors: Amr Mohsen, Los Gatos, CA (US); Hamdi El-Sissi, Los Gatos, CA (US)

(73) Assignee: Hope Artificial Intelligence Inc., Los Gatos, CA (US)

( * ) Notice: Subject to any disclaimer, the term of this patent is extended or adjusted under 35 U.S.C. 154(b) by 0 days.

(21) Appl. No.: 19/282,817

(22) Filed: Jul. 28, 2025

(65) Prior Publication Data

US 2025/0356770 A1 Nov. 20, 2025

Related U.S. Application Data

(63) Continuation of application No. 19/210,272, filed on May 16, 2025, which is a continuation of application
(Continued)

(51) Int. Cl.
*G09B 5/02* (2006.01)
*G06F 9/455* (2018.01)
(Continued)

(52) U.S. Cl.
CPC ........... *G09B 5/02* (2013.01); *G06F 9/45558* (2013.01); *G06Q 50/205* (2013.01); *G06Q 50/22* (2013.01); *G06F 2009/45587* (2013.01)

(58) Field of Classification Search
CPC ........................ G09B 5/02; G06F 2009/45587
See application file for complete search history.

(56) References Cited

U.S. PATENT DOCUMENTS 5,904,485 A * 5/1999 Siefert ................... G06F 40/12
434/350
11,769,420 B2 * 9/2023 Russell ................... G09B 7/02
434/362

(Continued)

*Primary Examiner* — Peter R Egloff
(74) *Attorney, Agent, or Firm* — Edward C. Kwok; VLP Law Group LLP

(57) ABSTRACT

Provided herein is a computer-implemented method for facilitating restricted transmission for educational contents, comprising: receiving, by one or more computer processors, a login request from a user of a plurality of users, wherein each user of the plurality of users may be assigned with a set of access parameters based at least in part on a role associated with the user, deploying, by the one or more computer processors, a virtual desktop for the user, wherein the virtual desktop is selected from a plurality of virtual desktop templates based at least in part on the role associated with the user, and wherein the virtual desktop is preconfigured based on the set of access parameters associated with the user, presenting, by one or more display devices, an educational content to the user via the virtual desktop in response to a request to access the education content from the user, wherein the virtual desktop is associated with a set of security measures, and wherein the request to access is checked against the set of security measures before granting the access; recording, by the one or more computer processors, learning progress associated with the user; and optionally adjusting, by an artificial intelligence (AI) and/or machine learning (ML) engines, the educational contents based at least in part on the learning progress associated with the user.

22 Claims, 11 Drawing Sheets

Related U.S. Application Data

No. 18/376,768, filed on Oct. 4, 2023, now Pat. No. 12,333,958.

(60) Provisional application No. 63/413,078, filed on Oct. 4, 2022.

(51) Int. Cl.
  *G06Q 50/20*          (2012.01)
  *G06Q 50/22*          (2018.01)

(56)          References Cited

U.S. PATENT DOCUMENTS

| | | | | |
|---|---|---|---|---|
| 2006/0166174 A1* | 7/2006 | Rowe | ..................... | G09B 5/06 |
| | | | | 434/236 |
| 2008/0248454 A1* | 10/2008 | Briggs | .................... | G09B 7/00 |
| | | | | 434/350 |
| 2009/0193173 A1* | 7/2009 | Joshi | ..................... | G06F 9/455 |
| | | | | 718/1 |
| 2011/0223576 A1* | 9/2011 | Foster | ..................... | G09B 7/02 |
| | | | | 434/362 |
| 2014/0024009 A1* | 1/2014 | Nealon | .................... | G09B 5/12 |
| | | | | 434/362 |
| 2015/0310757 A1* | 10/2015 | Moon | ..................... | G09B 7/04 |
| | | | | 434/350 |
| 2019/0079640 A1* | 3/2019 | Page | ..................... | G06F 16/957 |
| 2020/0118456 A1* | 4/2020 | Breed | .................... | G06F 3/167 |
| 2022/0222089 A1* | 7/2022 | Joshi | .................... | G06F 16/953 |
| 2022/0245226 A1* | 8/2022 | Sawada | ................... | G06F 21/32 |
| 2023/0066058 A1* | 3/2023 | Yadav | ............... | G09B 19/0053 |
| 2023/0412641 A1* | 12/2023 | Watkiss | ............. | H04L 63/1416 |

* cited by examiner

Login Page

Please Login to use KVDI

Username

Password

Reset

Login

KVDI

Desktop Templates
Containerized workspace
environments

Control
Interact with a desktop session

Settings
Configure roles and users

API Explorer
Interact with KVDI API

Login

Refresh    New Template

301

| Desktop Template | | | | | | | | |
|---|---|---|---|---|---|---|---|---|
| Template | Image | Root | File Transfer | Tags | ServiceAccount | Namespace | | |
| lstructorpt | globalservices/pt:0.0.2 | X | X | applications:pt,desktop:xfce4, os:ubuntu,type:shared | Service Account | Launch Namespace | | |
| monamedpt | globalservices/pt:0.0.2 | X | X | applications:pt, desktop:xfce4, os:ubuntu,type:shared | Service Account | Launch Namespace | | |
| packettracer | globalservices/pt:0.0.2 | X | X | applications:packettracer, desktop:xfce4, os:ubuntu | Service Account | Launch Namespace | | |
| pt | globalservices/pt:0.0.2 | X | X | applications:pt,desktop:xfce4, os:ubuntu,type:shared | Service Account | Launch Namespace | | |
| ptsharing | globalservices/pt:0.0.2 | X | X | applications:pt, desktop:xfce4, os:ubuntu,type:shared | Service Account | Launch Namespace | | |

Different Templates customized for different needs

KVDI
Desktop Templates
Control
Settings
API Explorer
Metrics
admin

FIG. 3 receiving a login request from a user of a plurality of users, wherein each user of the plurality of users may be assigned with a set of access parameters based at least in part on a role associated with the user 902 deploying a virtual desktop for the user, wherein the virtual desktop is selected from a plurality of virtual desktop templates based at least in part on the role associated with the user, and wherein the virtual desktop is preconfigured based on the set of access parameters associated with the user 904 presenting an educational content to the user via the virtual desktop in response to a request to access the education content from the user, wherein the virtual desktop is associated with a set of security measures, and wherein the request to access is checked against the set of security measures before granting the access 906 recording learning progress associated with the user 908

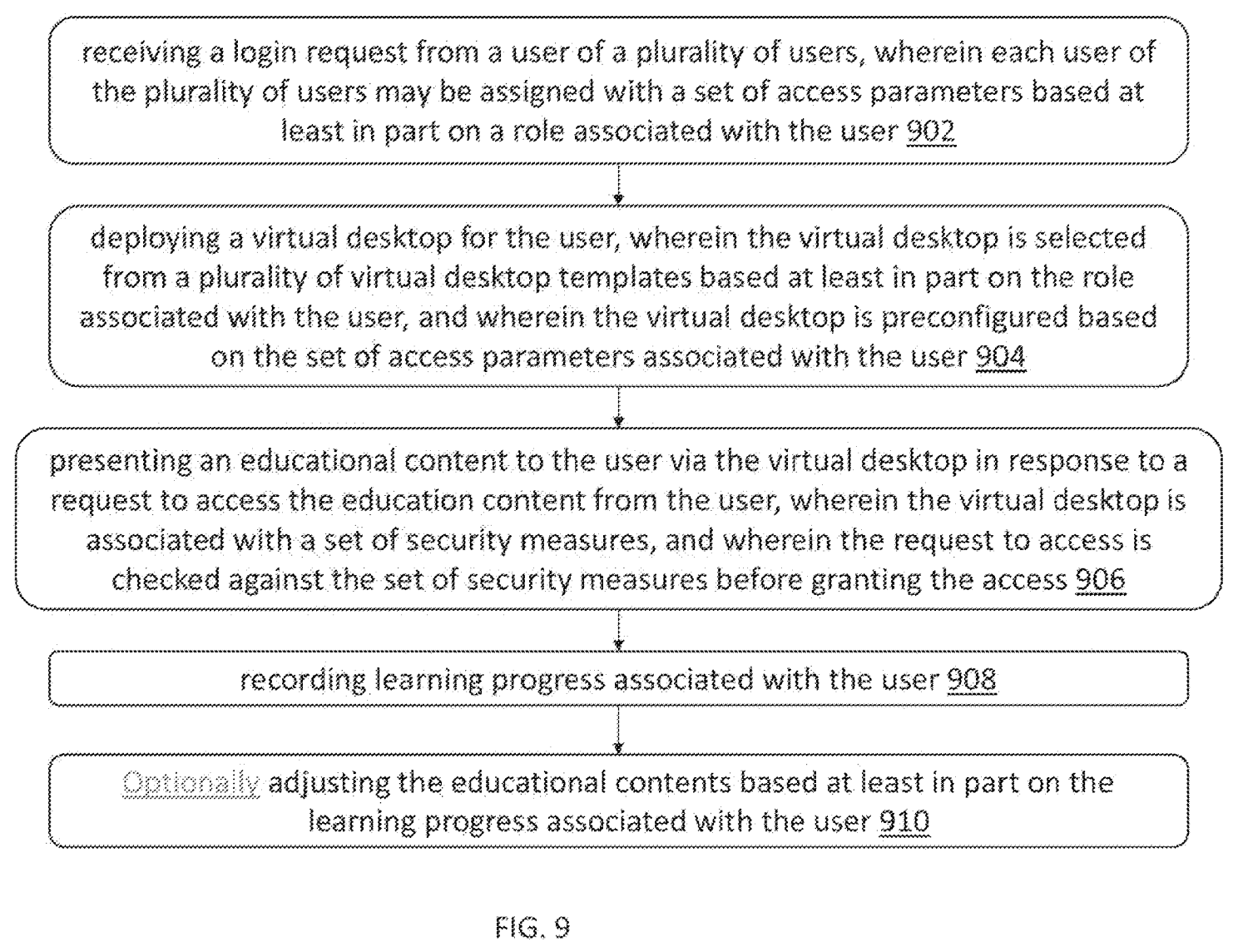

Optionally adjusting the educational contents based at least in part on the learning progress associated with the user 910

FIG. 9

METHODS AND SYSTEMS FOR SECURE SCALABLE PLATFORM PROVIDING EDUCATION PROGRAMS

BACKGROUND OF THE INVENTION

Providing online education programs in confined facilities such as prisons can be a complex and challenging task. One of the major difficulties lies in maintaining strict restrictions on access to internet content while delivering effective and engaging educational experiences. In a correctional facility, access to the internet and external content may be tightly controlled to prevent security breaches, inappropriate content, or other forms of abuse. This requires a careful balance between security measures and educational goals.

BRIEF SUMMARY OF THE INVENTION

The present disclosure provides a scalable, secure, and multi-tenant platform deployed in the cloud that adapts the courses to the learners' profiles while maintaining their privacy. The methods and systems provided herein deliver hybrid online (synchronous and asynchronous) programs and Hyflux modality on computers and portable devices accessible and scalable to all qualified adults in custody. The methods and systems provided herein provide a trusted platform with a central dashboard for secure single sign-on from various prisons. Virtual proxy negating the need for prison IT complex whitelisting process is provided herein to ease the management of access to different websites. Virtual desktop offering negating the need to install programs on prison computers is provided herein to facilitate the scalability and security of the online education platform.

In an aspect, provided herein is a computer-implemented method for facilitating restricted transmission for educational contents, comprising: receiving, by one or more computer processors, a login request from a user of a plurality of users, wherein each user of the plurality of users may be assigned with a set of access parameters based at least in part on a role associated with the user, deploying, by the one or more computer processors, a virtual desktop (VDI) for the user, wherein the virtual desktop is selected from a plurality of virtual desktop templates based at least in part on the role associated with the user, and wherein the virtual desktop is preconfigured based on the set of access parameters associated with the user, presenting, by one or more display devices, an educational content to the user via the virtual desktop in response to a request to access the education content from the user, wherein the virtual desktop is associated with a set of security measures, and wherein the request to access is checked against the set of security measures before granting the access; and recording, by the one or more computer processors, learning progress associated with the user.

In some embodiments of the computer-implemented method, the learning progress associated with the user is enhanced by modulating the educational contents based at least in part on data related to the activities associated with the user. In some embodiments of the computer-implemented method, the set of access parameters comprise one or more recorded learning progress. In some embodiments of the computer-implemented method, the set of access parameters indicates one or more follow-on educational contents based on the learning progress. In some embodiments of the computer-implemented method, the virtual desktop is configured to include one or more follow-on educational contents. In some embodiments of the computer-implemented method, the set of access parameters comprise one or more selected courses associated with the user. In some embodiments of the computer-implemented method, the set of parameters indicates one or more applications based on the selected courses. In some embodiments of the computer-implemented method, the virtual desktop is preconfigured to include one or more applications. In some embodiments of the computer-implemented method, the modulation of the educational contents based at least in part on data related to the activities associated with the user is carried out by Artificial Intelligence/Machine Learning (AI/ML) engines. In some embodiments of the computer-implemented method, the AI/ML engines are further configured to adjust the educational contents based on a performance associated with the user. In some embodiments of the computer-implemented method, the performance associated with the user comprise response speed, answer accuracy, completion ratio, and the like. In some embodiments of the computer-implemented method, the set of security measures is implemented by a virtual proxy server.

In some aspects, provided herein is a non-transitory computer-readable medium comprising machine-executable code that, upon execution by one or more computer processors, implements a method for facilitating restricted transmission for educational contents, comprising: (a) receive, by one or more computer processors, a login request from a user of a plurality of users, wherein each user of the plurality of users may be assigned with a set of access parameters based at least in part on a role associated with the user, (b) deploy, by the one or more computer processors, a virtual desktop for the user, wherein the virtual desktop is selected from a plurality of virtual desktop templates based at least in part on the role associated with the user, and wherein the virtual desktop is preconfigured based on the set of access parameters associated with the user, (c) present, by one or more display devices, an educational content to the user via the virtual desktop in response to a request to access the education content from the user, wherein the virtual desktop is associated with a set of security measures, and wherein the request to access is checked against the set of security measures before granting the access; and (d) record, by the one or more computer processors, learning progress associated with the user.

In some embodiments of the non-transitory computer-readable medium comprising machine-executable code, the learning progress associated with the user is enhanced by modulating the educational contents based at least in part on data related to the activities associated with the user. In some embodiments of the non-transitory computer-readable medium comprising machine-executable code, the learning progress associated with the user is enhanced by modulating the educational contents based at least in part on data related to the activities associated with the user. In some embodiments of the non-transitory computer-readable medium comprising machine-executable code, the set of access parameters comprise one or more recorded learning progress. In some embodiments of the non-transitory computer-readable medium comprising machine-executable code, the set of access parameters indicates one or more follow-on educational contents based on the learning progress. In some embodiments of the non-transitory computer-readable medium comprising machine-executable code, the virtual desktop is configured to include one or more follow-on educational contents. In some embodiments of the non-transitory computer-readable medium comprising machine-executable code, the set of access parameters comprise one or more selected courses associated with the user.

In some embodiments of the non-transitory computer-readable medium comprising machine-executable code, the set of parameters indicates one or more applications based on the selected courses. In some embodiments of the non-transitory computer-readable medium comprising machine-executable code, the virtual desktop is preconfigured to include one or more applications. In some embodiments of the non-transitory computer-readable medium comprising machine-executable code, the modulation of the educational contents based at least in part on data related to the activities associated with the user is carried out by AI/ML engines. In some embodiments of the non-transitory computer-readable medium comprising machine-executable code, the AI/ML engines are further configured to adjust the educational contents based on a performance associated with the user. In some embodiments of the non-transitory computer-readable medium comprising machine-executable code, the performance associated with the user comprise response speed, answer accuracy, completion ratio, and the like. In some embodiments of the non-transitory computer-readable medium comprising machine-executable code, the set of security measures is implemented by a virtual proxy server.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 3 illustrates an example user interface provided on a client node, according to one exemplary embodiment.

FIG. 9 is a flow diagram depicting an example process 900 for facilitating restricted transmission for educational contents, according to one exemplary embodiment.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed. Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Figure 1:
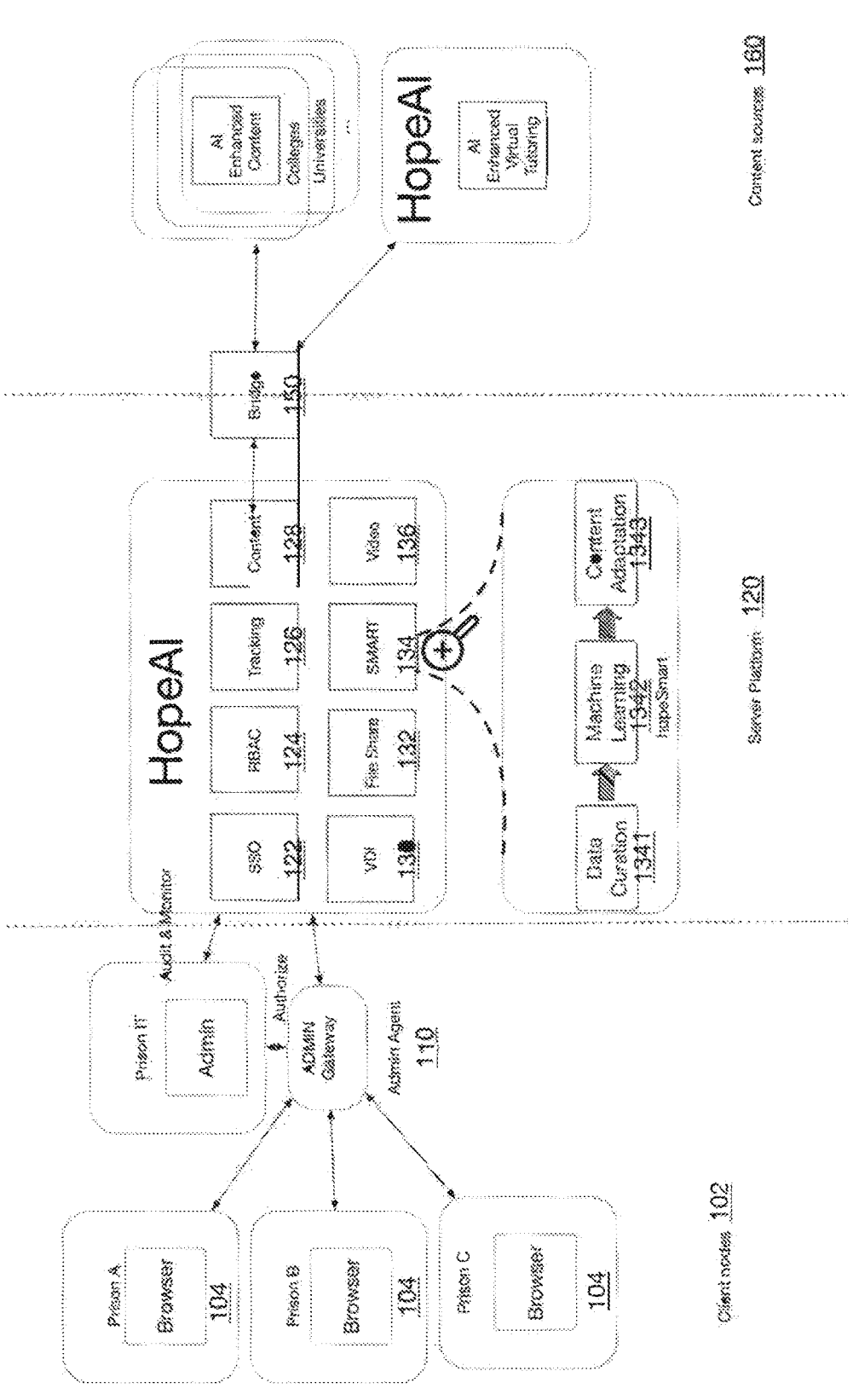
FIG. 1 is a block diagram depicting an example system, according to embodiments of the present disclosure, comprising a client-server architecture and network configured to perform the various methods described herein.

FIG. 1 is a block diagram depicting an example system comprising a client-server architecture and network configured to perform the various methods described herein. A platform (e.g., machines and software, possibly interoperating via a series of network connections, protocols, application-level interfaces, and so on), in the form of a server platform 120, provides server-side functionality via a communication network (not shown in FIG. 1; e.g., the Internet or other types of wide-area networks (WANs), such as wireless networks or private networks with additional security appropriate to tasks performed by a user) to one or more client nodes 102, and/or administration (admin) agent 110. FIG. 1 illustrates, for example, a client node 102 may be one or more computers on premise of a prison (e.g., prison A, B, C), wherein the client node 102 may hose a web browser 104, thus allowing a user to access functions provided by the server platform 120, for example, receiving data packet (e.g., educational contents, communication with a teacher) from the server platform 120. The web browser 104 may be compatible with any computer hardware used by a user of the client node 102.

The web browser 104 of system may help maintain security by allowing the user of the client node 102 to access functions provided by the server platform 120 without needing direct access to the underlying server hardware or software. For example, the server-side functionality and data may be kept secure and isolated from client node 102, which may be on the premises of a prison or other secure location. The web browser 104 may be configured with various security features such as encryption, authentication, and access controls to ensure that only authorized users can access the server platform 120 and its data.

In some embodiments, the web browser 104 of system may be a virtual desktop. A virtual desktop can maintain security and restricted access to the internet by a number of manners. For example, A virtual desktop may be configured with network policies that define which traffic is authorized in and out of the desktop. These policies can restrict internet access and allow only specific traffic to flow in and out of the desktop. In another example, VPNs may be used to provide secure access to the internet, allowing users to connect to the virtual desktop and access online resources without exposing the network to outside threats. By using a virtual desktop, the web browser 104 may provide a secure and restricted environment that allows users to access only the resources they need and/or allowed to access. In some embodiments, the virtual desktop may be pre-configured based on a few rules. For example, based on a role (adult in custody/student, instructor/teacher, etc.) of a user, the system may identify a set of access parameters associated with the user, and may configure the desktop accordingly. In some embodiments, the virtual desktop may comprise a set of security measures, and when a user requests to access contents, the virtual desktop may check against the security measures before granting the access.

In at least some examples, the server platform 120 may be one or more computing devices or systems, storage devices, and other components that include, or facilitate the operation of, various execution modules depicted in FIG. 1. These modules may include, for example, Single sign-on (SSO) module 122, role-based access control (RBAC) module 124, tracking module 126, content management module 128, virtual desktop infrastructure (VDI) module 130; file share module 132; video management module 136, and SMART system 134. The SMART system 134 may host sub-systems/modules such as data curation module 1341, machine learning module 1342, and/or content adaptation module 1343. Each of these modules is described in greater detail below.

The Single Sign-On (SSO) module 122, in some embodiments, may allow users, such as adults in custody or teachers, to log in once and access multiple applications or services without having to log in again. For example, it may be a centralized authentication mechanism that eliminates the need for users to remember multiple usernames and passwords for different systems. Once a user is authenticated through the SSO module, they can access any authorized application or service without having to log in again. This not only saves time but also helps to maintain security by reducing the risk of password-related security breaches, as users are not required to enter their login credentials multiple times. The SSO module 122 of the server platform 120 may ensure that only authorized users with valid credentials are able to access the system and its resources and provides an additional layer of security for the platform 120.

The Role-Based Access Control (RBAC) module 124, in some embodiments, may be responsible for managing user permissions and access control. For example, it may be a security model that specifies that access to resources should be based on the roles of individual users within an organization. In some embodiments, the RBAC module 124 may be used to define the roles of users, such as students, teachers, and administrators, and the access they have to different parts of the platform 120 and/or the contents. Each role may be defined with a set of permissions that determine what actions a user can perform on the system. For example, a student role may have access to view and complete assigned courses, while a teacher role may have access to create and manage courses. The RBAC module 124 may ensure that users only have access to the parts of the system that they are authorized to use and prevents unauthorized access to sensitive information.

The tracking module 126, in some embodiments, may be responsible for collecting data related to students and instructors' activities and progress, and storing this data for future use (e.g., feed into the SMART system 134 and/or one or more machine learning algorithms). For example, this data may include information such as which courses or modules a student has completed, how much time they spent on each activity, and their performance on assessments. The tracking module 126 may be used to monitor and analyze student progress, which can then be used to adapt course materials and teaching methods to better meet the needs of the students (e.g., by the functionalities of the SMART system 134). In some embodiments, the collected data can also be used for audit purposes to ensure compliance with regulatory requirements and to evaluate the effectiveness of the educational programs and teaching strategies. Additionally, or alternatively, the tracking module 126 may also provide real-time feedback to students and instructors, allowing them to monitor their progress and adjust their approach as necessary. The data collected by the tracking module 126 can be visualized through dashboards and reports, giving administrators and instructors insight into the performance and engagement of students.

The content management module 128, in some embodiments, may be responsible for managing the educational content hosted on the platform 120. For example, this may include importing content from different content sources 160, such as textbooks or other educational materials, from different colleges, universities and institutions, and transforming the received contents into a standard format that may be used on the platform 120. The content management module 128 may also manage the creation and modification of course materials, such as lesson plans, assessments, and assignments. In some embodiments, the content management module 128 may also include a review and approval process to ensure the quality and accuracy of the content before it is made available to students. In some embodiments, the content management module 128 may also include version control and access control mechanisms to manage changes and restrict access to certain content. Additionally, or alternatively, the content management module 128 may work in conjunction with the tracking module 126 to monitor the usage and effectiveness of different types of content and make recommendations for adaptation or improvement based on that data.

The virtual desktop infrastructure (VDI) module 130, in some embodiments, may be responsible for providing virtual desktops to users accessing the server platform 120. For example, it may allow users to access a remote desktop environment that is hosted on a server, rather than on their local machine. This helps to improve security, as the user is not storing sensitive data or applications locally on their machine, and the virtual desktop can be configured with specific access controls and security settings. The VDI module 130 may allow users to connect to their virtual desktop environment using a web browser (e.g., web browser 104) or remote desktop client, and provide the users with access to the applications and data they need to perform their work or access educational materials. The VDI environment can be customized to meet the specific needs of different user groups and can be scaled up or down to accommodate changes in demand. The VDI module 130 may help to improve security and reduce IT complexity by providing a centralized, secure environment for users to access the server platform 120 and its resources.

The file share module 132, in some embodiments, may be responsible for providing a secure and centralized location for storing and sharing files between users of the server platform 120. For example, it may allow instructors to upload course materials such as lecture slides or readings and enable students to access these materials from their virtual desktops or through the web browser interface. The file share module 132 may provide access controls to ensure that only authorized users can access or modify files and may also support version control to track changes to files over time. Additionally, or alternatively, the file share module 132 may be integrated with other modules such as the tracking module 126 and the SMART system 134 to enable data analysis and optional adaptive learning, for example, based on how files may be accessed and used by users of the platform.

The video management module 136, in some embodiments, may be responsible for managing and delivering educational videos to students and instructors. For example, it may provide a centralized platform for storing and managing video content, and may include features such as video transcoding, metadata tagging, and search functionality to help users find and access relevant videos. The video management module 136 may also include tools for managing user access to video content, such as role-based access controls (e.g., in collaboration with RBAC module 124) and user authentication mechanisms. Additionally, or alternatively, the video management module 136 may include analytics tools to track user engagement with video content and provide insights into how the videos are being used to support learning outcomes. Optionally, video management module 136 may be used to provide virtual video sessions where the instructors or Subject-Matter-Experts (SMEs) can engage remotely with students to guide them through the content and answer their questions.

The optional SMART system 134 may comprise various sub-systems/modules that work together or individually to provide intelligent and adaptive learning experiences to users. The data curation module 1341 may be responsible for collecting and organizing data related to student and instructor activities, such as course materials, assessment results, and user interactions with the platform. In some embodiments, the data curation module 1341 may also perform data cleaning and quality control tasks to ensure that the data is accurate and reliable. The machine learning module 1342 may use advanced algorithms and statistical models to analyze the data collected by the data curation module 1341 and identify patterns and trends related to student performance and learning outcomes. In some embodiments, the machine learning module 1342 may use this information to make recommendations for personalized learning paths, identify areas where students may need extra support, and provide real-time feedback to instructors on their teaching strategies. The content adaptation module 1343 may be responsible for adapting course materials and resources to better meet the needs of individual learners. For example, it may use data collected from other modules, and the analyses generated by the machine learning module 1342 to recommend specific resources or activities that are best suited to a particular learner's learning style or preferences. In some embodiments, the content adaptation module 1343 may also use natural language processing (NLP) and other techniques to customize content for learners with different levels of proficiency or expertise in each given subject.

In some embodiments, the platform uses artificial intelligence (AI) and machine learning (ML) technologies to optimize the students' engagement as well as their completion rate. In some embodiments, the ML components continuously connect engagement Key Performance Indicators (KPIs) such as the time passed on specific activities, the accuracy of responses and the topics where the students are scoring higher than the others. In some embodiments, the clicks are collected on the different components of a course. In some embodiments, KPIs are collected from the LMS and preprocessed to remove any invalid data that is considered as noise. In some embodiments, the right models are selected for optimizing the user experience based on one or more features that we are focusing on (e.g., engagement and completion of courses, optimizing the scores etc.). In some embodiments, a combination of collaborative filtering and classification techniques are used. In some embodiments, the collaborative filtering technique is implemented to recommend the next course activities based on the behavior of the student. In some embodiments, the system analyzes the user data to find similarities between users with the assumption that users who have similar preferences in the past will likely have similar preferences in the future. In some embodiments, based on the data collected about a user's behavior and interaction with the LMS the system calculates the similarity between the user's interactions with the course activities. Once the similarity is calculated, the system finds the most similar activities for a given user. Afterwards the system ranks the activities that the user didn't interact with yet based on their similarity. In some embodiments, under the collaborative filtering step, the course activities are shuffled to adapt to a particular user based on his behavior.

In some embodiments, the classification techniques are used to predict the user's performance and recommend action items to enhance it. In some embodiments, the classification techniques work to categorize the users in predefined classes. After analyzing the data collected about the user interaction with the different activities of the course, the algorithm will classify the user. In some embodiments, after classification, the system predicts the future performance of the user based on historical data of the class that he belongs to. In some embodiments, this technique is also used to predict how much time is left for the student to finish his class, e.g., whether he will be able to complete the prescribed sections and activities on time. In some embodiments, the system analyzes the data related to logins, quiz score, time passed on activities, assignment submissions to categorize the user in one of several predefined classes. In some embodiments, based on the classification, the system predicts when the student will finish the course and send recommendations, or reminders accordingly.

In some embodiments, the ML modules are implemented as a separate service that is working offline. In some embodiments, all the data that is being collected is stored on a separate column-based database that enhances the performance and efficiency of querying and analytics of the data. In some embodiments, all data related to any attribute is stored in a separate contiguous column to be accessed easily. In some embodiments, the recommendations and results of the ML are integrated back to the LMS through a REST API that allows showing the recommendations to the users as well as apply the changes to the components of the course.

Figure 2:
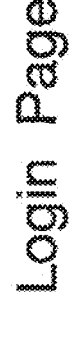
FIG. 2 illustrates an example user interface provided on a client node, according to one exemplary embodiment.

As shown in FIG. 1, the content sources 160 may comprise AI enhanced contents from colleges and universities and these contents may be transmitted to and from the server platform 120 via a bridge 150. The bridge 150 may act as a connector between the content sources 160 and the server platform 120, allowing for the transfer of AI-enhanced educational content. This content may come from colleges and universities, as well as other educational sources, and can include a variety of formats such as video lectures, interactive quizzes, and digital textbooks. The AI-enhanced aspect of the content may refer to the use of artificial intelligence techniques to improve the quality and effectiveness of the content, such as personalized recommendations for students based on their learning preferences and progress. Bridge 150 may use various protocols and standards to ensure secure and efficient transfer of the content, such as HTTPS and XML. FIG. 2 illustrates an example user interface provided on a client node 102 of FIG. 1, according to one exemplary embodiment. As shown in FIG. 2, the client node 102 may provide a web browser (e.g., web browser 104 in FIG. 1), and the web browser may present a login page to a user. As shown in FIG. 2, the login may be facilitated by a virtual desktop infrastructure, for example, by the VDI module 130 of the server platform 120 of the system illustrated by FIG. 1. The VDI module 130 may allow users to connect to their virtual desktop environment using a web browser (e.g., web browser 104) or remote desktop client, and provide the users with access to the applications and data they need to perform their work or access educational materials. The VDI environment can be customized to meet the specific needs of different user groups and can be scaled up or down to accommodate changes in demand. The VDI module 130 may help to improve security and reduce IT complexity by providing a centralized, secure environment for users to access the server platform 120 and its resources.

FIG. 3 illustrates an example user interface that is provided on a client node, according to one exemplary embodiment. As shown in FIG. 3, system may provide different desktop templates that may be customized for different purposes, needs, restrictions, types of users, etc. For example, the desktop template for an instructor may be different than the desktop template for a student adult in custody. In some embodiments, the role-based access control (RBAC) module 124 may collaborate with one or more other modules to provide a role-based assessment and then provide parameters for the access control for different roles associated with different accounts. In some embodiments, the role-based access control (RBAC) module 124 may collaborate with the VDI module to provide a role-based assessment and then provide parameters for the access control for different roles associated with different accounts. Each role may be defined with a set of permissions that determine what actions a user can perform on the system. For example, a student role may have access to view and complete assigned courses, while a teacher role may have access to create and manage courses. The RBAC module 124 may ensure that users only have access to the parts of the system that they are authorized to use and prevents unauthorized access to sensitive information. As shown in FIG. 2, those templates are configurable, for example, by clicking the pencil icon 301 (e.g., edit button). In some embodiments, only the account with Admin role may edit the templates. In some embodiments, all accounts may be able to edit the templates, as long as it is permitted by the parameters associated with the role of the account.

Figure 4:
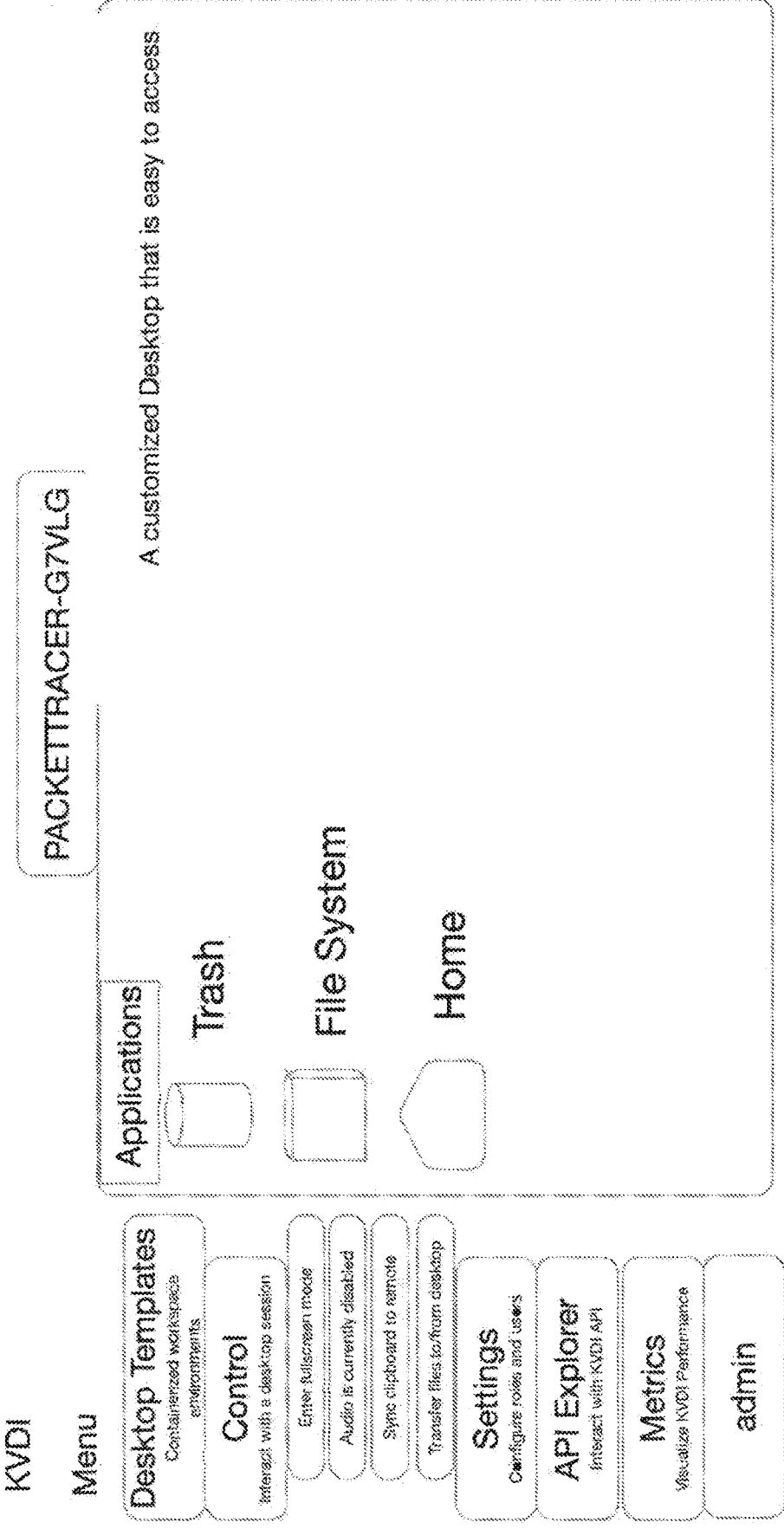
FIG. 4 illustrates an example user interface provided on a client node, according to one exemplary embodiment.

FIG. 4 illustrates an example user interface provided on a client node, according to one exemplary embodiment. As shown in FIG. 4, a customized desktop may provide easy access to the educational contents. For example, the control granted to a user may comprise Fullscreen mode, disable the audio, and other functions, etc. A user may configure roles and users in the settings section. In some embodiments, the user interface as shown in FIG. 4 may provide API explorer that may allow a user to interact with the APIs that are assigned (i.e., granted access to) to the current account.

Figure 5:
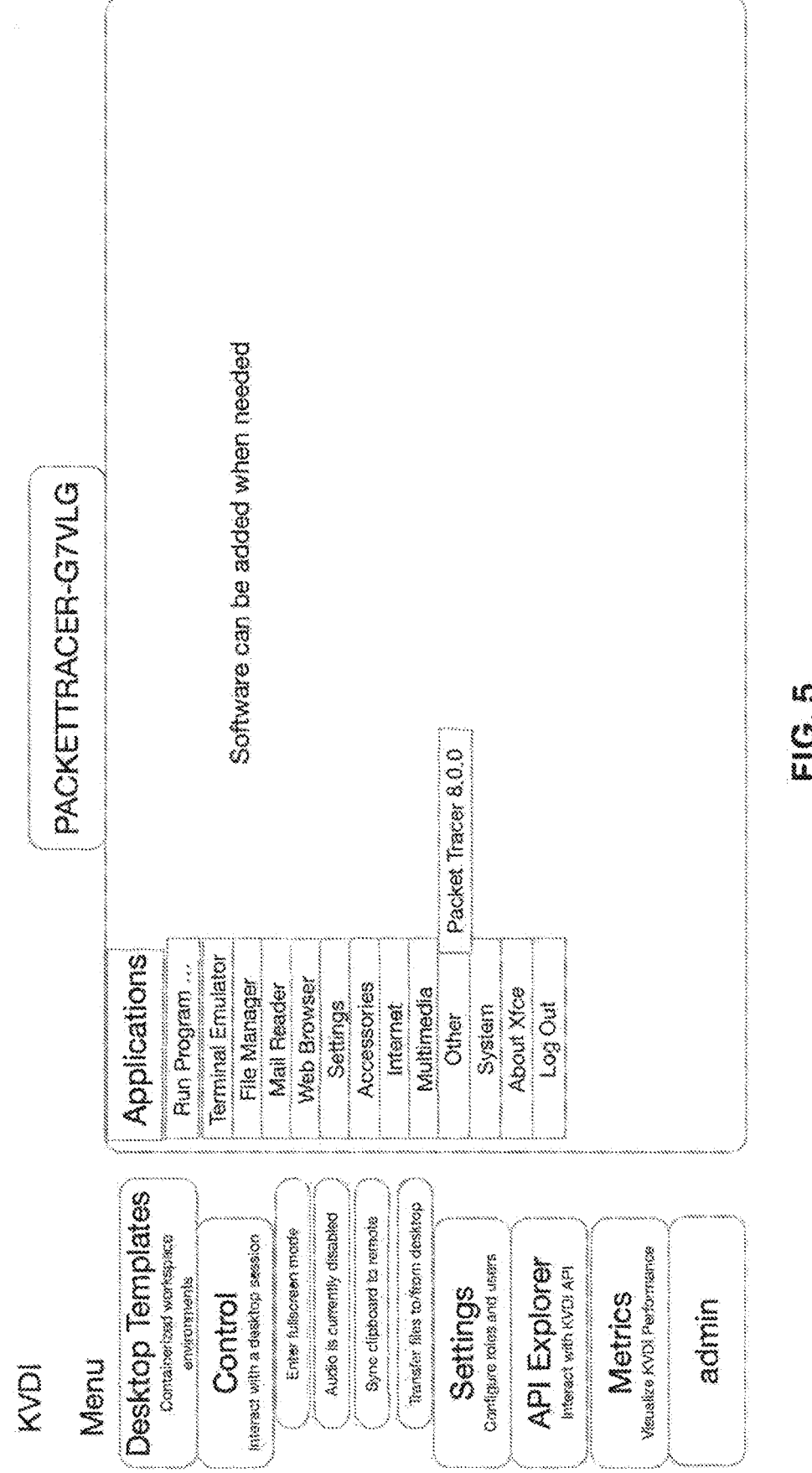
FIG. 5 illustrates an example user interface provided on a client node, according to one exemplary embodiment.

FIG. 5 illustrates an example user interface provided on a client node, according to one exemplary embodiment. As shown in FIG. 5, software may be added to an account when it is needed. For example, one or more applications or software packages may be added or granted access if the user associated with the account may need to use the applications to complete certain learning tasks. As shown in FIG. 5, the system may run one or more applications (e.g., Office, Packet Tracer, etc.) for the user if the user may need to use this software to complete one or more courses. In some embodiments, if the user signs up for an additional course, which may require usage of an additional application, then the application may be automatically added to the user's desktop.

Figure 6:
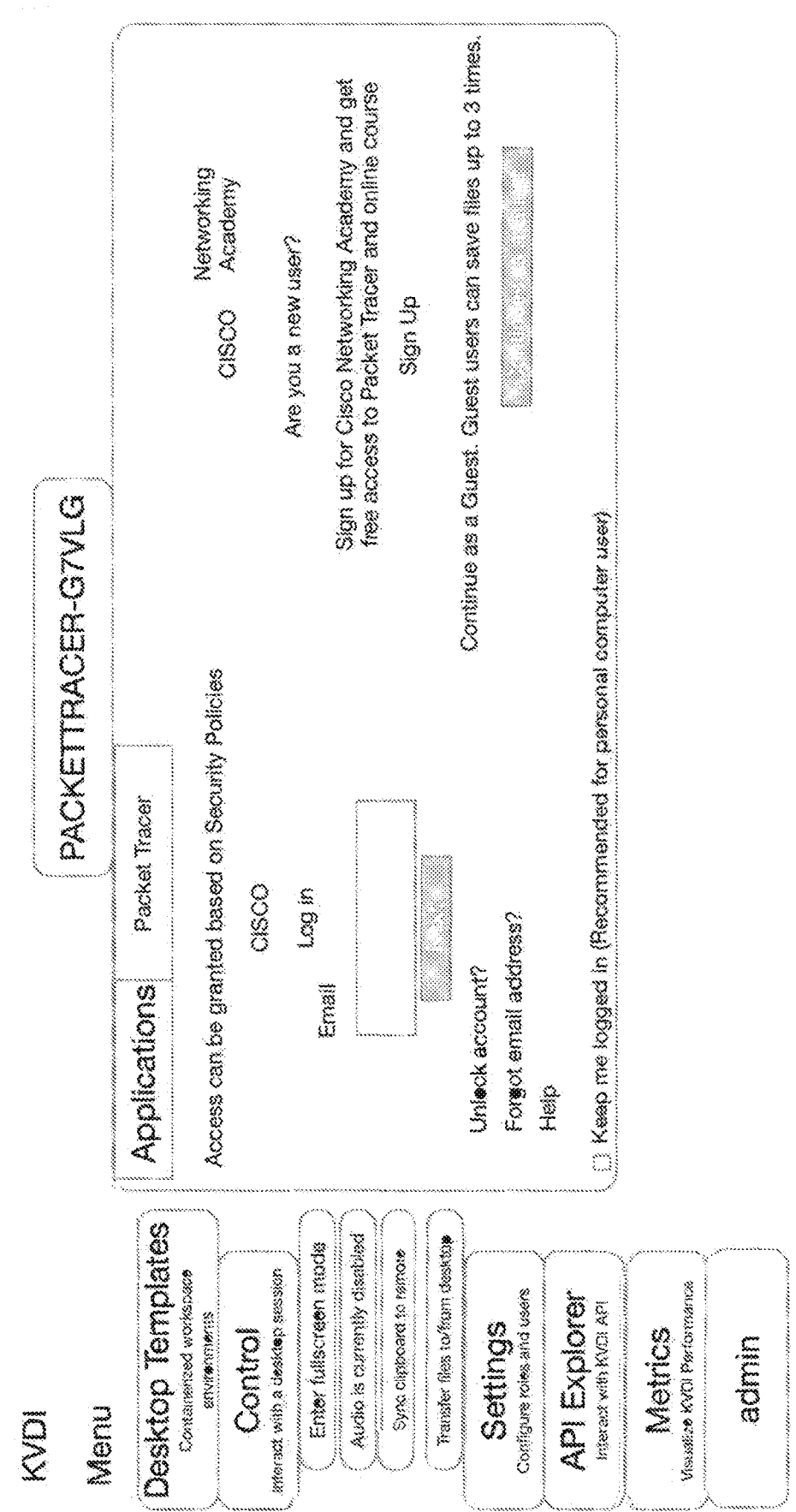
FIG. 6 illustrates an example user interface provided on a client node, according to one exemplary embodiment.

FIG. 6 illustrates an example user interface provided on a client node, according to one exemplary embodiment. As shown in FIG. 6, access to one or more educational content and/or interactive educational may be granted to an account holder based on security policies. As described herein elsewhere, a user may be able to obtain one or more online contents from a content provider. In some embodiments, the user may be able to create an account with a content provider, for example, a professional certificate issuer, etc. For example, as shown in FIG. 6, a user may register with CISCO, and attend a networking academy, wherein the user may be able to register via his or her virtual desktop. As shown in FIG. 6, if the user (and/or user's credential, account parameters, etc.) passes the security check, then the user is granted access to this online content.

Figure 7:
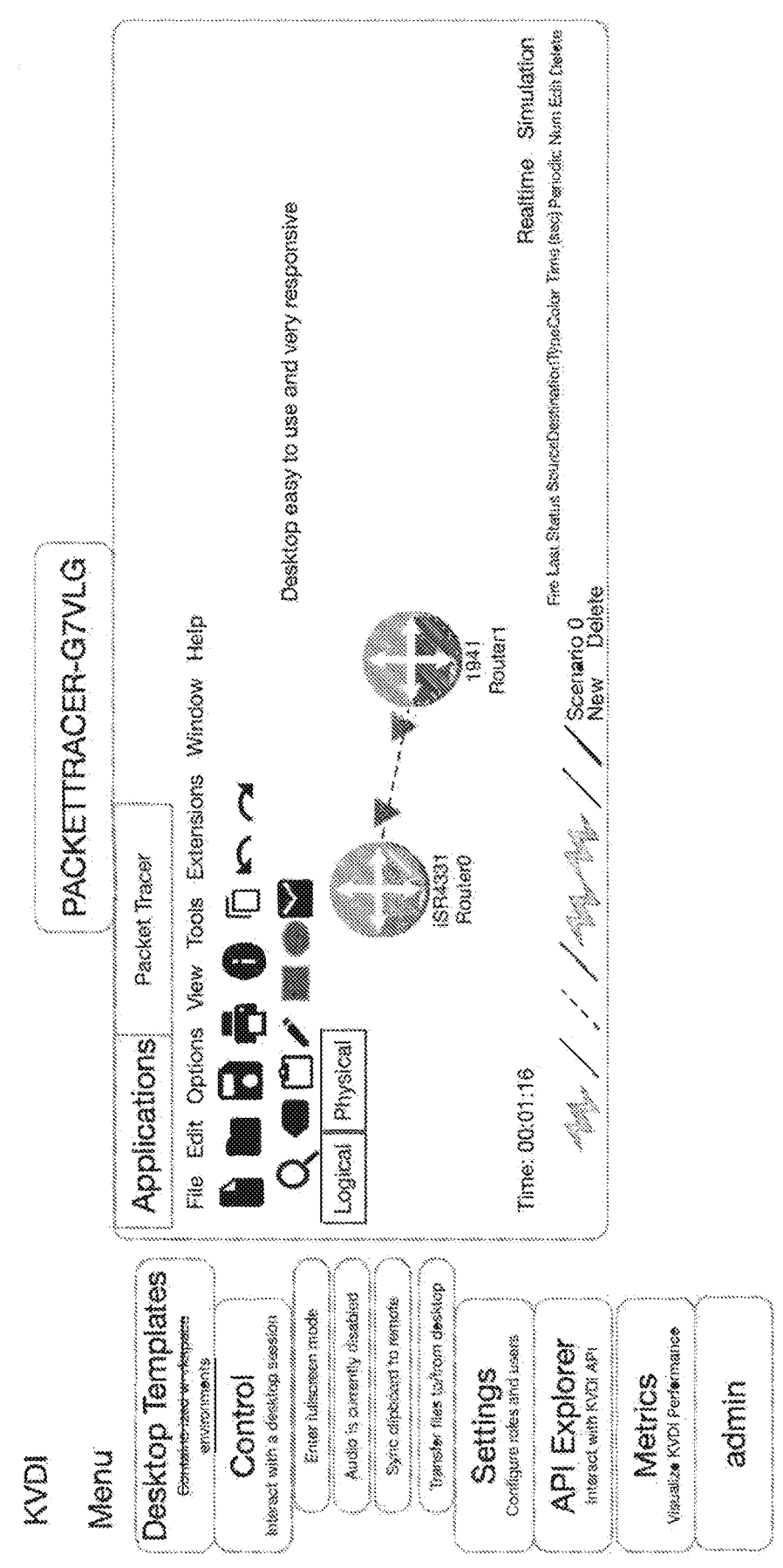
FIG. 7 illustrates an example user interface provided on a client node, according to one exemplary embodiment.

FIG. 7 illustrates an example user interface provided on a client node, according to one exemplary embodiment. As shown in FIG. 7, the desktop may present to a user an easy-to-use interface and is very responsive. FIG. 7 illustrates a Cisco Packet Tracer view, wherein the user is granted access to the Cisco Packet Tracer. In some embodiments, as described herein elsewhere, the user may be granted with access to one or more applications based on the courses enrolled. In some embodiments, the granted applications may be added automatically to the user's account and therefore visible/deployable via the users virtual desktop.

Figure 8:
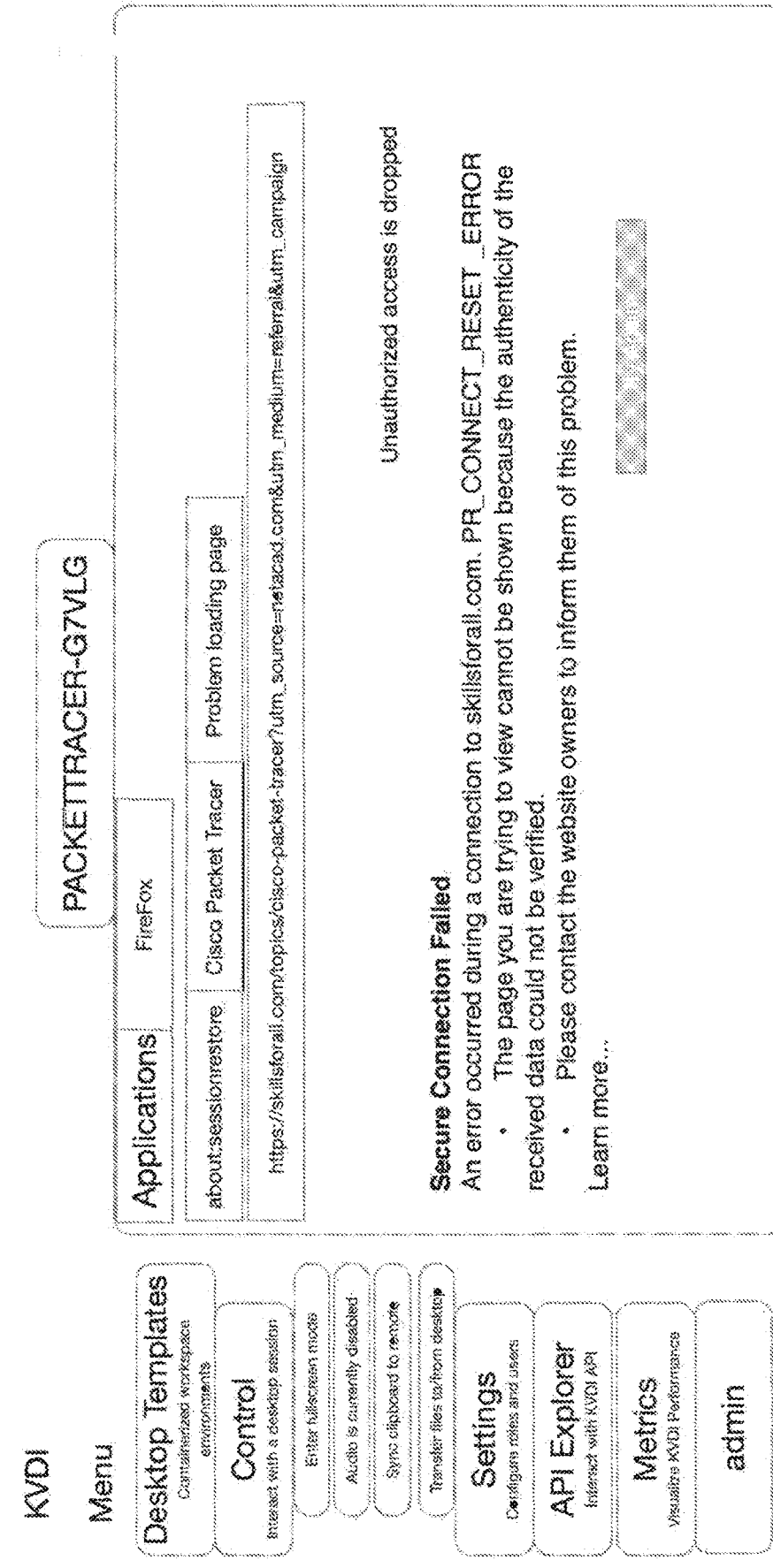
FIG. 8 illustrates an example user interface provided on a client node, according to one exemplary embodiment.

FIG. 8 illustrates an example user interface provided on a client node, according to one exemplary embodiment. As shown in FIG. 8, when a user is not granted access to one or more online courses, the virtual desktop will block the attempt to access, and shows to the user that this connection is failed. This may happen when the user attempts to access a course or content that is not included in their assigned course materials or curriculum (e.g., based on the security policy). The virtual desktop environment may be configured to only allow access to specific courses or content based on the user's assigned role and permissions. The failed connection message may include information on how to request access to the course or content from the appropriate authority or may direct the user to other available resources within their authorized access. This helps to ensure that users are only accessing the content and courses that are relevant to their needs and role within the educational program.

FIG. 9 is a flow diagram depicting an example process 900 for facilitating restricted transmission for educational contents, according to one exemplary embodiment. As depicted in FIG. 9, once the platforms and systems for the present disclosure is initialized, the process 900 begins with operation 902, wherein the system receives a login request from a user of a plurality of users. In some embodiments, each user of the plurality of users may be assigned with a set of access parameters based at least in part on a role associated with the user. For example, if a user is an adult in custody, then the set of access parameters associated with this user may provide a few websites that the user is allowed to access, i.e., permit-listing or granting access to websites. If, however, a user is an instructor or teacher, then the set of access parameters associated with the user may allow the user to access any website or other information that is available on the Internet. Next, process 900 may proceed to operation 904, wherein the system may deploy a virtual desktop for the user. In some embodiments, the virtual desktop may be selected from a plurality of virtual desktop templates, for example, based on the role (e.g., adult in custody, teachers, etc.) associated with the user. In some embodiments, the virtual desktop may be preconfigured for the user, for example, based on what courses a user is taking or teaching, based on the access parameters, or other factors the like. In some embodiments, the virtual desktop may be dynamically preconfigured for the user based on the transmission capacity.

Next, process 900 proceeds to operation 906, wherein the system may present an educational content to the user via the virtual desktop in response to a request to access the education content from the user. For example, a user may request to access a video course, and the system may present the video course via the virtual desktop. In some embodiment, the virtual desktop is associated with a set of security measures, and the request to access is checked against the set of security measures before granting the access. In some embodiments, the security measures may comprise access parameters. In some embodiments, the security measures may retrieve an IP address associated with virtual desktop, and implement pre-defined rules associated with an IP address or an IP address range.

Next, process 900 proceeds to operation 908, wherein the system may record learning progress associated with the user. In some embodiments, the learning progress may comprise at least one or more completion indicators of one or more modules of a course, a completion indicator of one or more courses, a score associated with one or more quizzes, etc. Next, the process 900 proceeds to operation 910, wherein the system may adjust the educational contents based at least in part on the learning progress associated with the user. In some embodiments, a Machine Learning module is utilized to generate the adjusted education contents for the user based on the learning progress he or she has made. For example, the system may adjust the difficulty level of the course material, provide additional resources to help the user better understand certain concepts, or offer alternative learning paths based on the user's strengths and weaknesses. The adjustments may also take into account the user's learning style, pace, and preferences, as well as any accessibility needs or accommodations. By adapting the educational contents to the user's individual needs and progress, the system may improve the user's learning outcomes and overall satisfaction with the educational experience.

Figure 10:
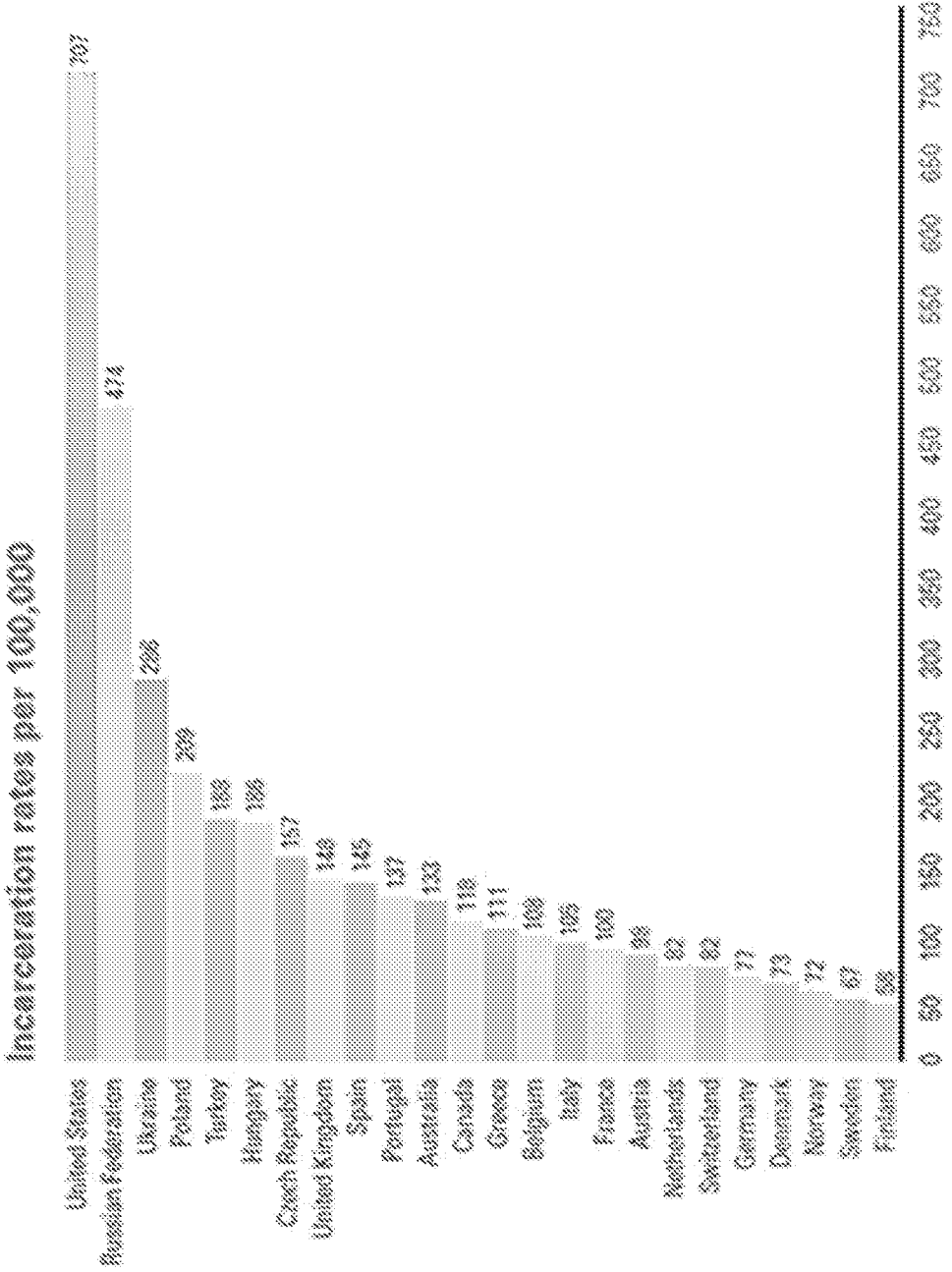
FIG. 10 illustrates the incarceration rates for a few countries.

FIG. 10 illustrates the incarceration rates for several countries. The United States spends a staggering $80.7 billion on public prisons and jails each year, with the cost of housing a single adult in custody ranging from $50,000 to $81,000 annually (reaching as high as $81,203 in California in 2020). With 2.5 million people incarcerated in the US and over 700,000 adults in custody released each year, the country accounts for a quarter of the world's incarcerated population despite having only 5% of the world's total population. These numbers are compounded by the high rate of recidivism, with two-thirds of released prisoners ultimately ending up back in prison. These statistics highlight the high cost and high rates of incarceration and recidivism in the United States. The large amount of money spent on public prisons and jails, coupled with the high cost of housing an adult in custody, reflects the financial burden of the current criminal justice system. The fact that the US has a quarter of the world's incarcerated population despite only having 5% of the world's population raises questions about the effectiveness and fairness of the system.

Additionally, the high rate of recidivism suggests that current methods of rehabilitation and reentry may not be adequately addressing the root causes of criminal behavior. The United States has the highest incarceration per capita and recidivism rate in the world, in spite of being among the richest and most technologically advanced countries in the world. The cloud-based secure education platform provided herein is accessible by any adult in custody with a simple browser on a thin client computer and therefore scalable to reach many of the incarcerated population offering a potential solution to address the issue of high rates of recidivism in the United States by providing personalized learning experiences to incarcerated individuals. The optional AI enhanced capabilities of the education platform provided herein enhances the adaptive learning experiences. By recording and analyzing their learning progress, the platform can adjust the educational content to better meet their needs and address the underlying causes of criminal behavior. This could potentially lead to better outcomes for individuals post-release and reduce the financial burden on the criminal justice system and better social outcome overall.

Computer Systems

Figure 11:
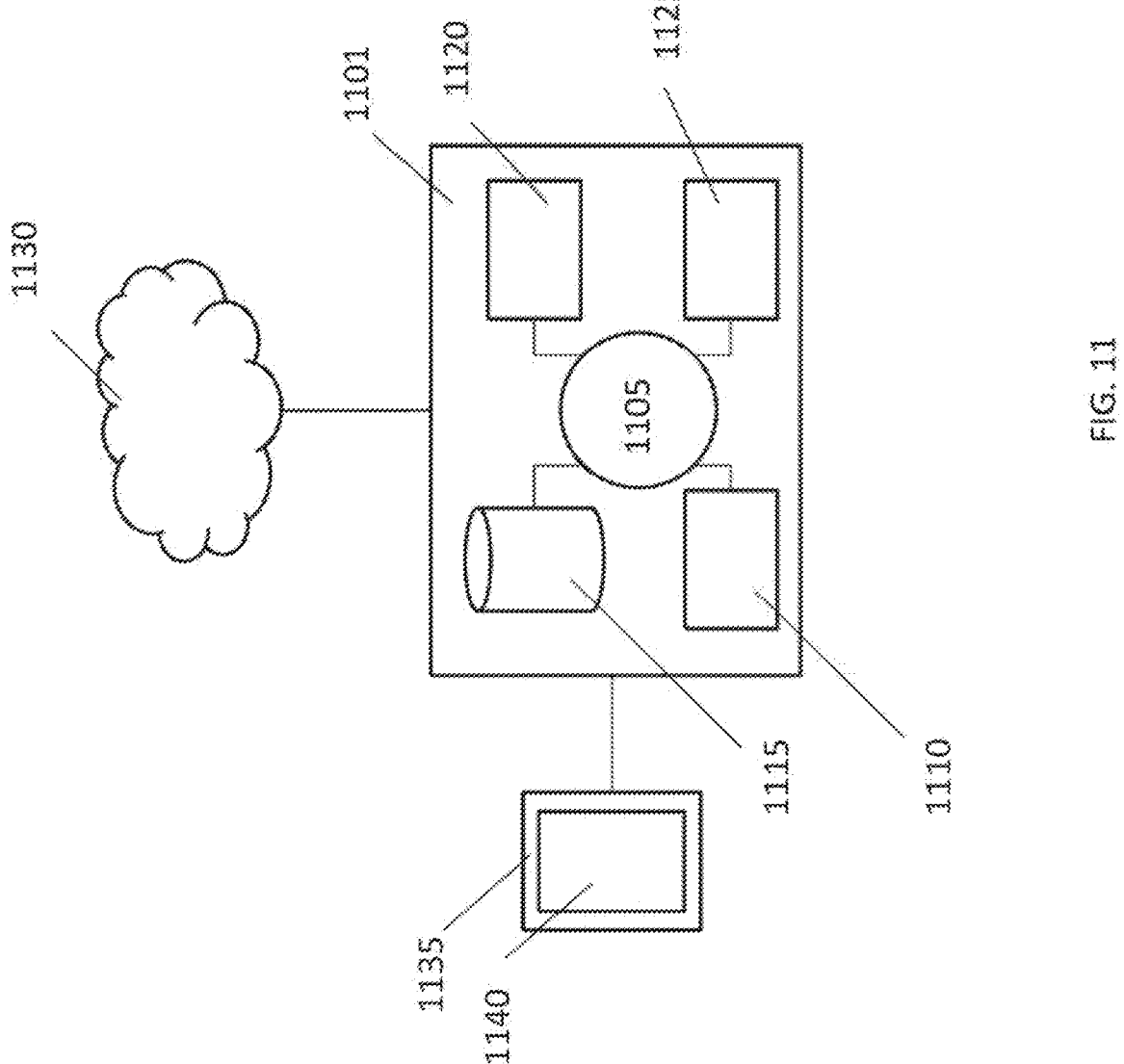
FIG. 11 shows a computer system that is programmed or otherwise configured to implement methods provided herein.

The present disclosure provides computer systems that are programmed to implement methods of the disclosure. FIG. 11 shows a computer system 1101 that is programmed or otherwise configured to alter an appearance of the interactive data units. The computer system 1101 can be an electronic device of a user or a computer system that is remotely located with respect to the electronic device. The electronic device can be a mobile electronic device.

The computer system 1101 includes a central processing unit (CPU, also "processor" and "computer processor" herein) 1105, which can be a single core or multi core processor, or a plurality of processors for parallel processing. The computer system 1101 also includes memory or memory location 1110 (e.g., random-access memory, read-only memory, flash memory), electronic storage unit 1115 (e.g., hard disk), communication interface 1120 (e.g., network adapter) for communicating with one or more other systems, and peripheral devices 1125, such as cache, other memory, data storage and/or electronic display adapters. The memory 1110, storage unit 1115, interface 1120 and peripheral devices 1125 are in communication with the CPU 1105 through a communication bus (solid lines), such as a motherboard. The storage unit 1115 can be a data storage unit (or data repository) for storing data. The computer system 1101 can be operatively coupled to a computer network ("network") 1130 with the aid of the communication interface 1120. The network 1130 can be the Internet, an Internet and/or extranet, or an intranet and/or extranet that is in communication with the Internet. Network 1130 in some cases is a telecommunication and/or data network.

Network 1130 can include one or more computer servers, which can enable distributed computing, such as cloud computing. The network 1130, in some cases with the aid of the computer system 1101, can implement a peer-to-peer network, which may enable devices coupled to the computer system 1101 to behave as a client or a server. The CPU 1105 can execute a sequence of machine-readable instructions, which can be embodied in a program or software. The instructions may be stored in a memory location, such as memory 1110. The instructions can be directed to the CPU 1105, which can subsequently program or otherwise configure the CPU 1105 to implement methods of the present disclosure. Examples of operations performed by the CPU 1105 can include fetch, decode, execute, and writeback.

The CPU 1105 can be part of a circuit, such as an integrated circuit. One or more other components of system 1101 can be included in the circuit. In some cases, the circuit is an application specific integrated circuit (ASIC).

The storage unit 1115 can store files, such as drivers, libraries, and saved programs. The storage unit 1115 can store user data, e.g., user preferences and user programs. The computer system 1101 in some cases can include one or more additional data storage units that are external to the computer system 1101, such as located on a remote server that is in communication with the computer system 1101 through an intranet or the Internet.

The computer system 1101 can communicate with one or more remote computer systems through network 1130. For instance, computer system 1101 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iphone, Android-enabled device, Blackberry®), or personal digital assistants. The user can access computer system 1101 via the network 1130.

Methods as described herein can be implemented by way of machine (e.g., computer processor) executable code stored on an electronic storage location of the computer system 1101, such as, for example, on the memory 1110 or electronic storage unit 1115. The machine executable or machine-readable code can be provided in the form of software. During use, the code can be executed by processor 1105. In some cases, the code can be retrieved from storage unit 1115 and stored on the memory 1110 for ready access by the processor 1105. In some situations, the electronic storage unit 1115 can be precluded, and machine-executable instructions are stored on memory 1110.

The code can be pre-compiled and configured for use with a machine having a processer adapted to execute the code or can be compiled during runtime. The code can be supplied in a programming language that can be selected to enable the code to execute in a pre-compiled or as-compiled fashion.

Aspects of the systems and methods provided herein, such as the computer system 1101, can be embodied in programming. Various aspects of the technology may be thought of as "products" or "articles of manufacture" typically in the form of machine (or processor) executable code and/or associated data that is carried on or embodied in a type of machine-readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Hence, a machine-readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as the main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1101 can include or be in communication with an electronic display 1135 that comprises a user interface (UI). Examples of UI's include, without limitation, a graphical user interface (GUI) and web-based user interface. Methods and systems of the present disclosure can be implemented by way of one or more algorithms. An algorithm can be implemented by way of software upon execution by the central processing unit 1105.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it should be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby. While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it should be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for facilitating restricted transmission of educational content, the educational content being made accessible to a plurality of users through predetermined computing resources in a secure environment that includes an access control authority, the computer-implemented method comprising:

(a) assigning each user a role from a group of roles, including one or more student roles and one or more instructor roles, each assigned role being associated with a set of access rights to the education content and to the computing resources;

(b) upon receiving a request for access to the educational content from one of the users at a user device, the requesting user presenting personal identification credentials:

(i) based on the requesting user's assigned role, selecting a virtual desktop template from a plurality of virtual desktop templates, each virtual desktop template being associated with a set of access rights to the educational content and the computing resources based on security policies of the secure environment;

(ii) presenting to the access control authority the requesting user's personal identification credentials, the requesting user's assigned role and the selected virtual desktop template to obtain approval for the requesting user to access the educational content; and (iii) upon obtaining the approval, configuring from the computing resources a virtual desktop for use by the requesting user; and presenting the educational content over the configured virtual desktop;

(c) collecting data regarding each user's mastery of the education content, the time spent on each activity, and their performance on assessments; and (d) auditing the data collected from all users to ensure compliance with regulatory requirements of the secure environment, including the security policies, and to evaluate the effectiveness of the educational programs and teaching strategies.

2. The method of claim 1, further comprising recording learning progress made by the requesting user of the educational content.

3. The method of claim 1, wherein the configured virtual desktop disables use of extension managers on the user device.

4. The method of claim 1, wherein the virtual desktop is configured to allow access to one or more follow-on educational contents.

5. The method of claim 2, wherein the computing resources include artificial intelligence and machine learning elements that adjust the educational content according to the recorded learning progress.

6. The method of claim 5, wherein the artificial intelligence and machine learning elements use user activity and engagement data to predict future performance and to recommend subsequent user or course activities.

7. The method of claim 1, wherein the access control authority is implemented by a virtual proxy server.

8. The method of claim 1, wherein the computing resources further comprise a video management module which provides virtual video sessions in which a user in one of the instructor roles can engage remotely with one or more users in the student roles to provide guidance through the educational content or to answer questions.

9. The method of claim 1, wherein the access control authority further restricts the selected virtual desktop template to implement additional network policies or to authorize specific traffic.

10. The method of claim 1, wherein the access control authority is cloud-based, and includes an access control module specialized for managing assignments of user to the group of roles.

11. The method of claim 1, wherein the educational content is hosted in a cloud-based secure platform with access limited to a preauthorized or a restricted set of internet protocol (IP) addresses.

12. The method of claim 1, wherein a user's personal identification credentials include information encoded by the access control authority that is not revealed to the user, thereby allowing secure authorized access to computing resources without knowing involvement by the user holding the personal identification credentials.

13. The method of claim 1, wherein the access control authority endows the virtual desktop with authorized network access rights to allow access to third-party websites or applications.

14. A non-transitory computer-readable medium comprising machine-executable code that implements a method for facilitating restricted transmission of educational content, the educational content being made accessible to a plurality of users through predetermined computing resources in a secure environment that includes an access control authority, the method comprising:

(a) assigning each user a role from a group of roles, including one or more student roles and one or more instructor roles, each assigned role being associated with a set of access rights to the education content and to the computing resources;

(b) upon receiving a request for access to the educational content from one of the users at a user device, the requesting user presenting personal identification credentials:

(i) based on the requesting user's assigned role, selecting a virtual desktop template from a plurality of virtual desktop templates, each virtual desktop template being associated with a set of access rights to the educational content and the computing resources based on security policies of the secure environment;

(ii) presenting to the access control authority the requesting user's personal identification credentials, the requesting user's assigned role and the selected virtual desktop template to obtain approval for the requesting user to access the educational content; and (iii) upon obtaining the approval, configuring from the computing resources a virtual desktop for use by the requesting user; and presenting the educational content over the configured virtual desktop;

(c) collecting data regarding each user's mastery of the education content, the time spent on each activity, and their performance on assessments; and (d) auditing the data collected from all users to ensure compliance with regulatory requirements of the secure environment, including the security policies, and to evaluate the effectiveness of the educational programs and teaching strategies.

15. The medium of claim 14, further comprising recording learning progress made by the requesting user of the educational content.

16. The medium of claim 14, wherein the access control authority is implemented by a virtual proxy server.

17. The medium of claim 14, wherein the computing resources further comprise a video management module which provides virtual video sessions in which a user in one of the instructor roles can engage remotely with one or more users in the student roles to provide guidance through the educational content or to answer questions.

18. The medium of claim 14, wherein the access control authority further restricts the selected virtual desktop template to implement additional network policies or to authorize specific traffic.

19. The medium of claim 14, wherein the access control authority is cloud-based, and includes an access control module specialized for managing assignments of user to the group of roles.

20. The medium of claim 14, wherein the educational content is hosted in a cloud-based secure platform with access limited to a preauthorized or a restricted set of internet protocol (IP) addresses.

21. The medium of claim 14, wherein a user's personal identification credentials include information encoded by the access control authority that is not revealed to the user, thereby allowing secure authorized access to computing resources without knowing involvement by the user holding the personal identification credentials.

22. The medium of claim 14, wherein the access control authority endows the virtual desktop with authorized network access rights to allow access to third-party websites or applications.

\* \* \* \* \*